(12) United States Patent
Koide et al.

(10) Patent No.: US 6,499,989 B2
(45) Date of Patent: Dec. 31, 2002

(54) DISK REMOVING DEVICE

(75) Inventors: Atsushi Koide, Nagano-ken (JP); Jun Nakazawa, Nagano-ken (JP)

(73) Assignee: Nissei Plastic Industrial Co., Ltd., Nagano (JP)

( * ) Notice: Subject to any disclaimer, the term of this patent is extended or adjusted under 35 U.S.C. 154(b) by 78 days.

(21) Appl. No.: 09/833,150

(22) Filed: Apr. 11, 2001

(65) Prior Publication Data

US 2001/0028903 A1 Oct. 11, 2001

(30) Foreign Application Priority Data

Apr. 11, 2000 (JP) ........................................ 2000-109265

(51) Int. Cl.[7] ............................................. B29C 45/42
(52) U.S. Cl. ........................ 425/556; 264/334; 425/444; 425/DIG. 60
(58) Field of Search .............................. 425/556, 436 R, 425/444, DIG. 60; 264/334, 335, 336

(56) References Cited

U.S. PATENT DOCUMENTS 4,204,824 A * 5/1980 Paradis ........................ 425/444
5,629,031 A * 5/1997 Ishikawa et al. ............. 264/334
6,390,804 B1 * 5/2002 Akino et al. .................. 264/334

* cited by examiner

Primary Examiner—Tim Heitbrink
(74) Attorney, Agent, or Firm—Merchant & Gould P.C.

(57) ABSTRACT

Disk removing device uses its disk pickup arm to remove or take out, from an injection mold unit, a disk having been molded by the mold unit. The disk removing device includes a rotary motor for rotating the disk pickup arm, and an arm support shaft which has the disk pickup arm at its distal end portion and which is rotated, together with the arm, by the rotary motor. The arm support shaft is coupled at its other end to a linear shaft of a linear motor so that the rotary and linear motors are coupled with each other in series via the arm support shaft. The disk removing device also includes a bearing member rotatable by the rotary motor, and the arm support shaft is supported by the bearing member for rotation and axial sliding movement relative to the bearing member. Such arrangements can effectively reduce the necessary number of component parts and overall size of the disk removing device, and thus the disk removing device can be installed snugly in a small space.

5 Claims, 5 Drawing Sheets

DISK REMOVING DEVICE

BACKGROUND OF THE INVENTION

1. Field of the Invention

The present invention relates generally to disk removing devices for use as attachments to injection molding apparatus for producing disks, and more particularly to an improved disk removing device for removing a molded disk from an injection mold unit.

2. Description of the Related Art

FIG. 5 is a schematic perspective view showing a typical example of a conventional disk removing device, which is particularly explanatory of basic operational principles of the disk removing device. Disk 103 is formed into a predetermined shape by an injection mold unit, i.e. between fixed and movable mold members (i.e., mold halves) 101 and 102, of an injection molding apparatus. To remove or take out the thus-molded disk 103 from the injection mold unit, the movable mold member 102 is first retracted in a direction of arrow ①, then a pivotable disk pickup arm 104 is inserted between the fixed mold member 101 and the retracted movable mold member 102, and then a suction cup 105, secured at the distal end of the arm 104, is pressed against the molded disk 103. Once the injection-molded disk 103 is completely grasped by the suction cup 105, the disk pickup arm 104 with the disk 103 firmly grasped by the suction cup 105 is horizontally displaced away from the movable mold member 102 as denoted by arrow ② and then caused to pivotally move as denoted by arrow ③, so that the disk 103 is transferred via the arm 104 over to an appropriate position outside the injection mold unit. Note that the above-mentioned horizontal displacement of the disk pickup arm 104 in the arrow ② direction is necessary for disengaging the molded disk 103 from the movable mold member 102 without the disk 103 being scratched or damaged otherwise by the mold member 102. To perform such disk removing operations, the conventional disk removing device includes a rotary motor 110 that is mounted on a motor base 111 for causing the disk pickup arm 104 to pivotally move in the arrow ③ direction. The motor base 111 is placed on a pair of rails 112 in such a manner that the motor base 111 can horizontally slide along the rails 112 by means of a feed screw 113 and a feed motor 114 both provided alongside the rails 112. More specifically, the horizontal displacement of the disk pickup arm 104 in the arrow ② direction is carried out by activation of the feed motor 114, and the subsequent pivotal movement of the disk pickup arm 104 is performed by activation of the rotary motor 110.

As apparent from the illustrated example of FIG. 5, the rails 112, motor base 111, feed screw 113, feed motor 114 and rotary motor 110 are all essential for the conventional disk removing device, which would unavoidably lead to increases in the number of the essential component parts, size and necessary installing space of the disk removing device. As a result, it was heretofore difficult to reduce the overall cost and size of the injection molding apparatus to which the disk removing device is attached.

SUMMARY OF THE INVENTION

It is accordingly an object of the present invention to provide a disk removing device which has a reduced size and thus can be installed in a small installing space.

In order to accomplish the above-mentioned object, the present invention provides a disk removing device for removing or taking out, from an injection mold unit, a disk molded by the injection mold unit, which comprises: a disk pickup arm for firmly holding or grasping the disk at a tip end portion of the disk pickup arm; an arm support shaft having the disk pickup arm at a distal end portion thereof; a bearing member for supporting the arm support shaft for axial sliding movement and rotation relative to the bearing member; a rotary motor for rotating the bearing member about an axis of the arm support shaft; and axial drive means for linearly moving the arm support shaft in an axial direction of the arm support shaft. Here, the arm support shaft is provided to extend through the rotary motor so as to position, or operatively connect, the rotary motor and axial drive means in series with each other along the axial direction of the arm support shaft disk. Thus, the disk removing device of the present invention can operate as a uniaxial drive device for removing the molded disk from the injection mold unit.

In the present invention, the molded disk is removed or taken out from the injection mold unit that comprises, for example, two mold members (mold haves), by first displacing the disk pickup arm away from one of the mold members by means of the axial drive means and then causing the disk pickup arm to pivotally move via the arm support shaft by means of the rotary motor. The arm support shaft extends through the rotary motor to be coupled, at the other end remote from the disk pickup arm, to the axial drive means, and thus the rotary motor and axial drive means are operatively connected in series with each other via the support shaft. This way, the inventive disk removing device can operate as a uniaxial drive device. The uniaxial drive arrangement of the invention can significantly reduce the necessary operating space and installing space of the disk removing device, so that the injection molding apparatus, to which the disk removing device is attached, can be effectively reduced in overall size.

In one preferred implementation, the axial drive means is a linear motor which generates thrust force electrically. Because the linear motor requires no mechanic gear or ball, there is no need to worry about lubrication, which can greatly facilitate maintenance and inspection of the axial drive means. Further, the linear motor, i.e. electric-type axial drive means having no mechanical component part, can be made smaller in size than mechanical-type axial drive means.

It is preferable that the rotation of the arm support shaft be by way of a planetary-gear-type speed reduction mechanism, because the above-mentioned rotary motor can be prevented from being subjected to excessive loads when causing the disk pickup arm to pivotally move via the arm support shaft.

Further, the arm support shaft is preferably coupled to a linear shaft of the axial drive means via a shaft coupling. It is preferable that the shaft coupling have a non-rotatable coupling case, the arm support shaft be rotatably connected to the coupling case via bearings and the linear shaft be connected directly to the coupling case, because the linear shaft in this case is allowed to only move linearly with no rotation.

BRIEF DESCRIPTION OF THE DRAWINGS

Certain preferred embodiments of the present invention will be described in greater detail with reference to the accompanying sheets of drawings, in which.

DETAILED DESCRIPTION OF THE PREFERRED EMBODIMENTS

Figure 1:
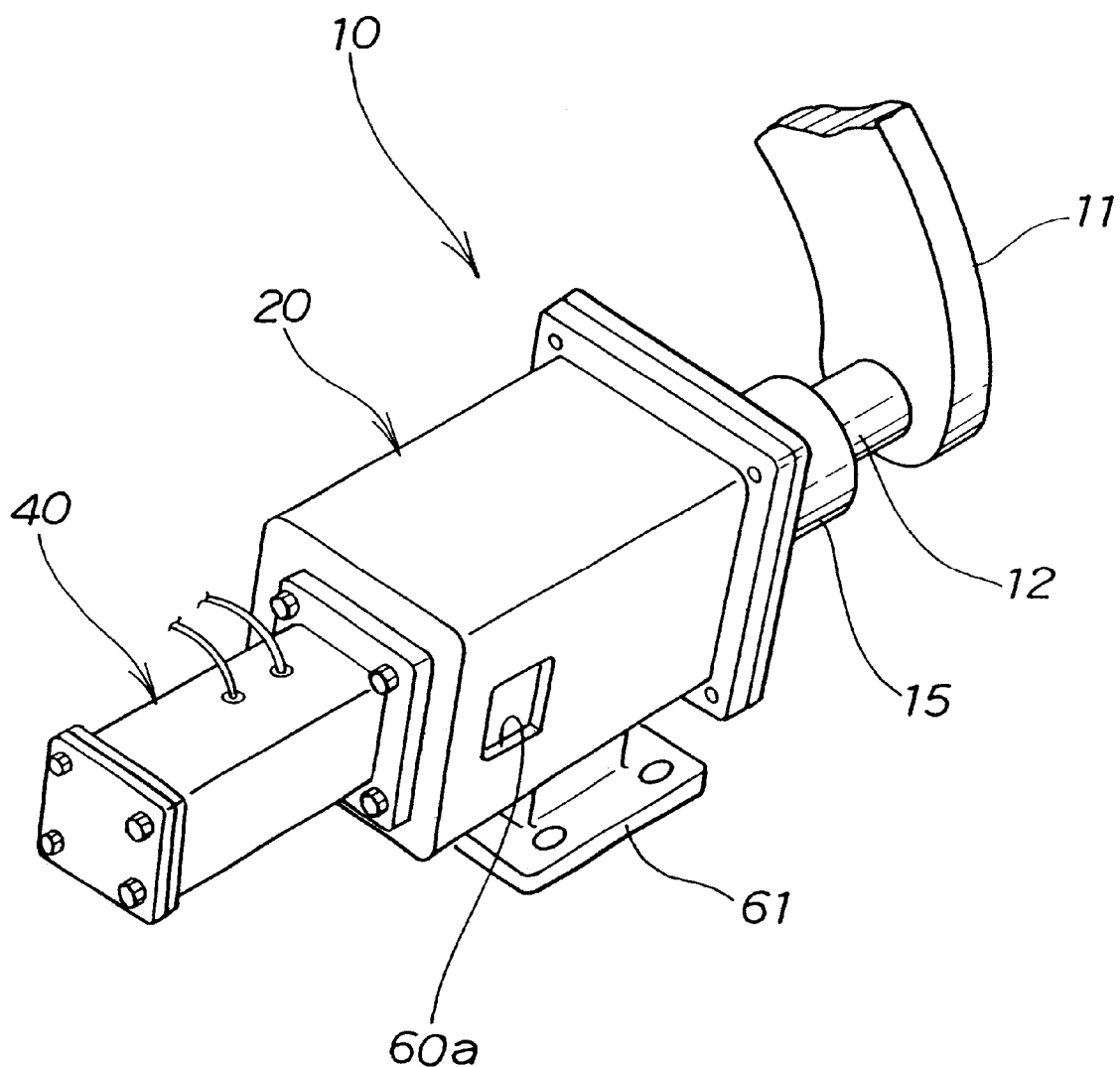
FIG. 1 is a perspective view showing a general setup of a disk removing device in accordance with an embodiment of the present invention.

FIG. 1 is a perspective view showing a general setup of a disk removing device in accordance with an embodiment of the present invention. The disk removing device 10 of FIG. 1, which is attached to an injection molding apparatus for producing a disk, includes a rotary motor 20 for rotating an arm support shaft 12 so that a disk pickup arm 11, secured at the distal end of the support shaft 12 and having a suction cup 74 (FIG. 3) at its tip, is caused to pivotally move in a predetermined direction. The disk removing device 10 also includes an axial drive unit 40 for linearly moving the arm support shaft 12 in the axial direction of the shaft 12. The axial drive unit 40 is preferably in the form of a linear motor, as will be described below in relation to FIG. 2.

Figure 2:
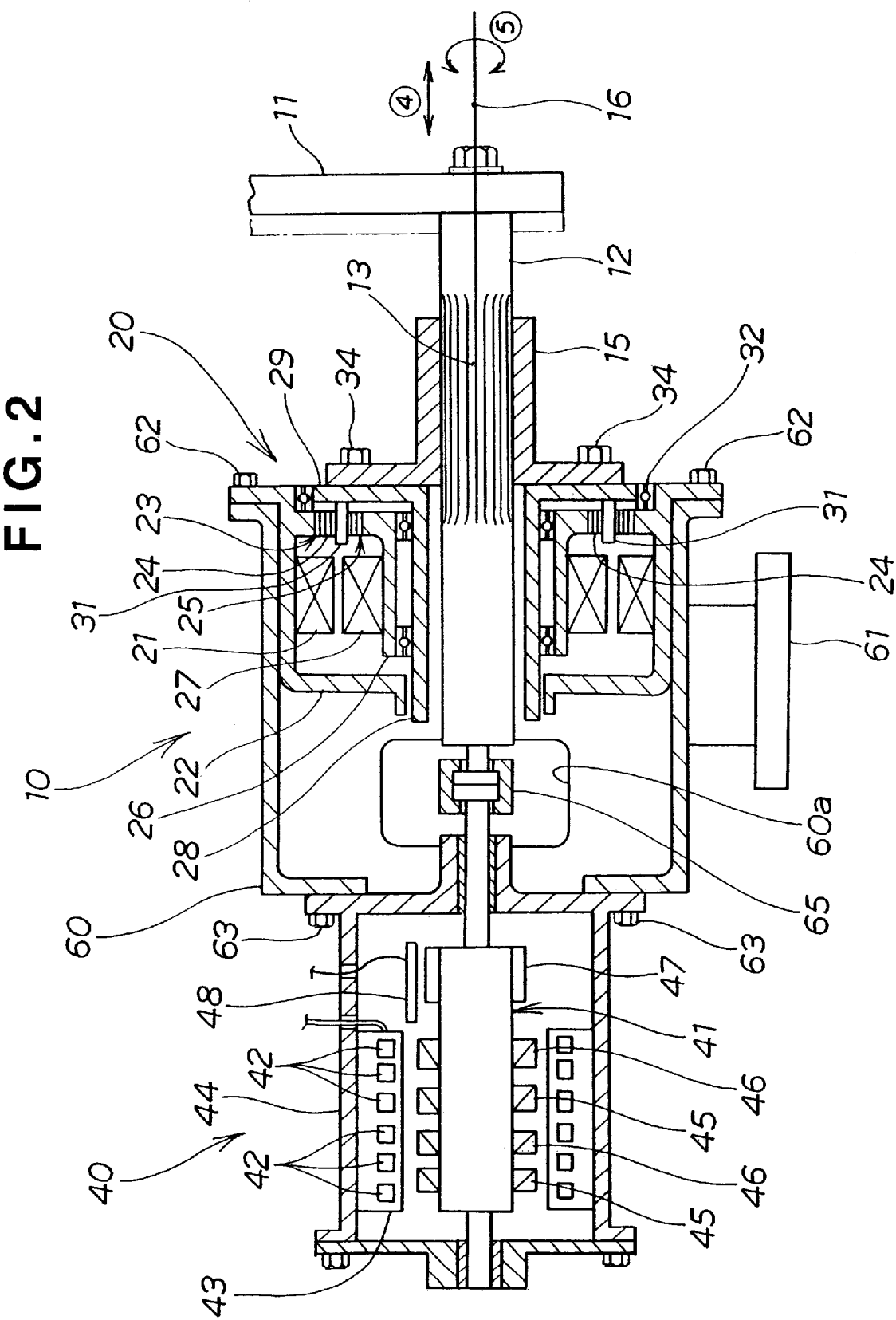
FIG. 2 is an enlarged sectional view of the disk removing device of FIG. 1.

FIG. 2 is an enlarged sectional view of the disk removing device 10. As clearly seen in this figure, the disk removing device 10 includes, in addition to the above-mentioned arm support shaft 12 having the disk pickup arm 11, a bearing member 15 that is fitted over the shaft 12 and supports the shaft 12 for axial sliding movement therealong (as denoted by arrow ④), by means of a spline-contact surface 13 of the shaft 12 or other equivalent coupling structure. In the disk removing device 10, the rotary motor 20 is activated to rotate the bearing member 15 about an axis 16 of the arm support shaft 12 (i.e., in a direction of arrow ⑤), and the linear motor 40 feeds the arm support shaft 12 horizontally in the axial direction (arrow ④). The arm support shaft 12 is provided to extend through the rotary motor 20 to be coupled, at the other end remote from the disk pickup arm 11, to the axial drive unit 40, so that the rotary motor 20 and linear motor 40 are positioned and operatively connected in series with each other via the shaft 12.

The coupling structure equivalent to the spline-contact surface 13 may be a ball-spline structure based on a spline contact assisted by balls, key engagement, engagement between a rectangular hole and a shaft of a rectangular sectional shape corresponding or complementary to that of the hole, or the like; however, the present invention may employ any other suitable coupling structure between the arm support shaft 12 and the bearing member 15.

The rotary motor 20 has a motor case 22 in which is provided a stator coil 21. Further, the motor case 22 has a ring gear 23 of a planetary-gear-type speed reducer or speed reduction mechanism, and the ring gear 23 meshes with a plurality of (three or more) planetary gears 24 which in turn mesh with a central sun gear 25. Sleeve 26 having the sun gear 25 integrally formed thereon is positioned within the motor case 22, and a rotor magnet 27 is mounted on the sleeve 26. Hollow motor shaft 28 extends through such a sleeve 26 in concentric relation thereto, and this hollow motor shaft 28 has a flange 29 integrally formed at its one end (right end in the illustrated example). The flange 29 of the hollow motor shaft 28 has a plurality of inward pins 31 on which the above-mentioned planetary gears 24 are rotatably mounted. In this manner, the rotary motor 20 is constructed as having a built-in speed reducer. Reference numeral 32 represents bearings for rotatably coupling the flange 29 of the hollow motor shaft 28 to the motor case 22.

The rotary motor 20 itself operates as follows. As the rotor magnet 27 is repelled by the stator coil 21 by magnetic action, the sleeve 26 and the sun gear 25 integrally formed on the sleeve 26 are caused to rotate as in the conventional motors. The rotating movement of the sun gear 25 causes the planetary gears 24 to rotate about the corresponding pins 31 and also start moving along the inner periphery of the ring gear 23. By such movement of the planetary gears 24 along the ring gear 23, the flange 29 and hence the hollow motor shaft 28 start rotating.

In general, the planetary-gear-type speed reducers are a mechanism which can reduce or increase speed by making stationary one of its three elements (i.e., the sun gear, planetary gears and ring gear), and causing the remaining two elements to function as input and output sections. The planetary-gear-type speed reducer employed in the instant embodiment is capable of providing a high speed reduction ratio by making the ring gear 23 stationary while causing the sun gear 25 to function as the input section and the planetary gears 24 as the output section.

Further, in the instant embodiment, the bearing member 15 is secured to the flange 29, for example, by means of bolts 34, so that the bearing member 15 and arm support shaft 12 coupled therewith in the above-mentioned manner can be rotated at any desired low speed. Note that a control motor, such as a pulse motor, selsyn motor, synchronous motor or servo motor, can effectively control the bearing member 15 and arm support shaft 12 to turn by only a desired angle less than one complete rotation (360°) and at a desired low speed. In the case where such a control motor is used in the instant embodiment, the planetary-gear-type speed reducer may be omitted.

However, by providing the planetary-gear-type speed reducer as in the illustrated example, the rotation speed of the hollow motor shaft 28 can be reduced as necessary and yet output torque from the shaft 28 can be increased, although the rotor section (i.e., a combination of the sleeve 26 and rotor magnet 27) is allowed to rotate at high speed. Thus, there is no need to use a large-size (namely, high-power) motor, and the size and cost of the rotary motor 20 can be readily reduced. Note that the rotary motor 20 may be of any type as long as its motor shaft is in a hollow shape.

The following paragraphs describe the linear motor 40 which, in the illustrated example, is a D.C. linear motor. The linear motor 40 is designed to reciprocally move a linear shaft 41 only in the axial direction (arrow ④ direction) without rotating the linear shaft 41. Core 43 provided concentrically around the linear shaft 41 and having a plurality of armature coils 42 provided therein is attached to the inner surface of a linear motor case 44. Further, a plurality of ring-shaped magnets 45 and 46, together constituting a field magnet, are mounted on the outer surface of the linear shaft 41 in such a manner that their N and S magnetic poles alternate in the axial direction of the linear shaft 41. This way, the linear shaft 41 is allowed to linearly move relative to the linear motor case 44. Position of the linear shaft 41 is detected by a sensor head 48 monitoring a scale 47 fixed to the linear shaft 41.

It should be appreciated that the linear shaft 41 may be axially moved via any other suitable axial drive means than the linear motor 40, such as an electromotive ball screw mechanism comprising a combination of a ball screw, nut and motor, or an electromotive pinion and rack mechanism comprising a combination of a pinion-rack set and motor.

More specifically, in the case where the electromotive ball screw mechanism is employed, the linear shaft 41 is formed as the ball screw on which the nut is screwed. The nut is also attached to a case similar to the above-mentioned linear motor case 44 in such a manner that the nut is rotatable relative to the motor case 44 but prevented from being moved in the axial direction. Then, either the nut or the ball screw is rotated by the motor. If the nut is rotated by the motor, the ball screw can move axially without rotation, while if the ball screw is rotated by the motor, the ball screw can move axially while rotating.

Further, in the case where the electromotive pinion and rack mechanism is employed, the linear shaft 41 is formed as the rack for engagement with the pinion that is rotated by the motor. The rotation of the pinion by the motor can linearly move the rack; reciprocal movement of the rack is attained by the motor rotating the pinion in two directions.

Using any desired one of the linear motor 40, electromotive ball screw mechanism and electromotive pinion and rack mechanism, the instant embodiment allows the arm support shaft 12 to move linearly in the arrow ④ direction. Pneumatic or hydraulic cylinder may also be employed for the same purpose, i.e. for linearly moving the linear shaft 41 and hence the arm support shaft 12.

Namely, in the instant embodiment, the arm support shaft 12 may be axially moved via any suitable axial drive unit or means. However, the use of the linear motor 40, electromotive ball screw mechanism or electromotive pinion and rack mechanism is advantageous because it only necessitates simple wiring to the motor, while the use of the pneumatic or hydraulic cylinder necessitates tedious operations for laying air-pressure directing pipes, or water- or liquid-pressure directing pipes.

However, the electromotive ball screw mechanism and electromotive pinion and rack mechanism, having balls and gears as their principal components, would require frequent maintenance and inspection operations including lubrication of the balls and gears, and besides, the overall size of these mechanisms is relatively great. On the other hand, the linear motor 40 requires substantially no lubrication and other maintenance (namely, the linear motor 40 can continue to work substantially on a maintenance-free basis), and can be compact in its overall size. For these reasons, the linear motor 40 can be used most suitably as the axial drive means for axially moving the arm support shaft 12.

The various elements having been described above in relation to FIG. 2 can be organized as a uniaxial-type drive device in the following way. Namely, there is provided a cylindrical casing 60 having a leg 61, and the rotary motor 20 is inserted in the cylindrical casing 60 via one end (right end in FIG. 2) of the casing 60 and then secured to the casing 60 by means of bolts 62. The linear motor case 44 is fastened to the other end (left end in FIG. 2) of the casing 60 by means of bolts 63, and the arm support shaft 12 and linear shaft 41 are connected together, end to end, via a shaft coupling 64. Note that reference numeral 60a represents a working hole formed in the cylindrical casing 60 for installing the shaft coupling 64 in the interior of the casing 60 and manipulating the coupling 64 as necessary after the installation.

Figure 3:
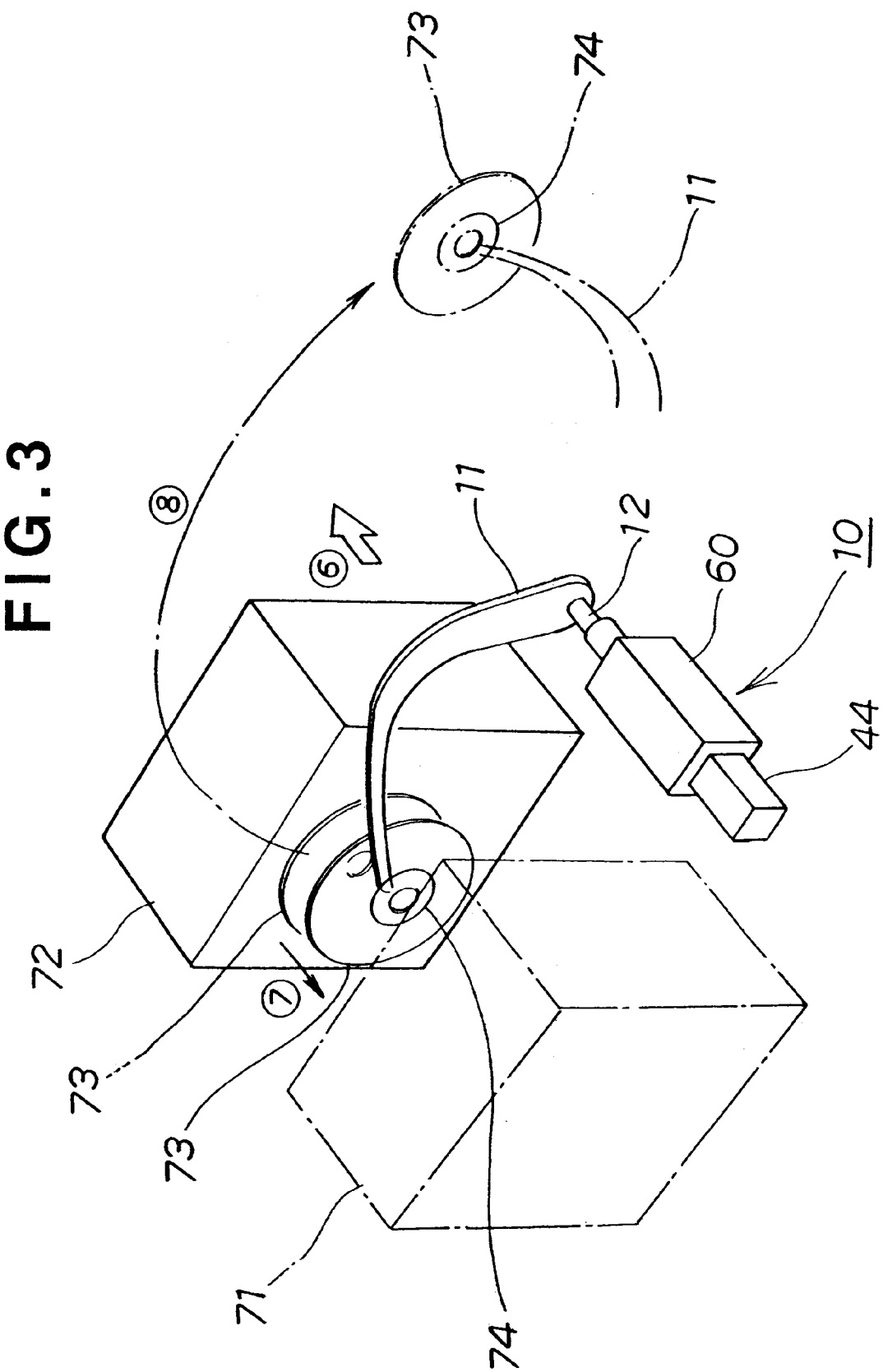
FIG. 3 is a schematic perspective view of the disk removing device, which is explanatory of behavior of the device.

Next, a description will be given about operation of the disk removing device of the invention constructed as above. FIG. 3 is a schematic perspective view of the disk removing device, which is explanatory of the behavior of the device. To take out or remove a disk 73 having been formed into a predetermined shape by the injection mold unit (fixed and movable mold members 71 and 72) of the injection molding apparatus, the movable mold member 72 is first displaced away from the fixed mold member 71 in a direction of arrow ⑥. Then, the disk pickup arm 11 is placed between the fixed and movable mold members 71 and 72, and the suction cup 74 fixed at the tip of the arm 11 is pressed against the surface of the injection-molded disk 73. Once the injection-molded disk 73 is completely grasped by the suction cup 74, the disk pickup arm 11 is displaced horizontally away from the movable mold member 72 as denoted by arrow ⑦ and then caused to pivotally move via the art support shaft 12 as denoted by arrow ⑧, so that the disk 73 is transferred to an appropriate position outside the injection mold unit.

It should be appreciated that the suction cup 74 of the disk pickup arm 11 may be replaced by any other type of mechanical disk grasping member as long as the injection-molded disk 73 can be firmly grasped by the disk grasping member for the removal purpose.

Figure 5:
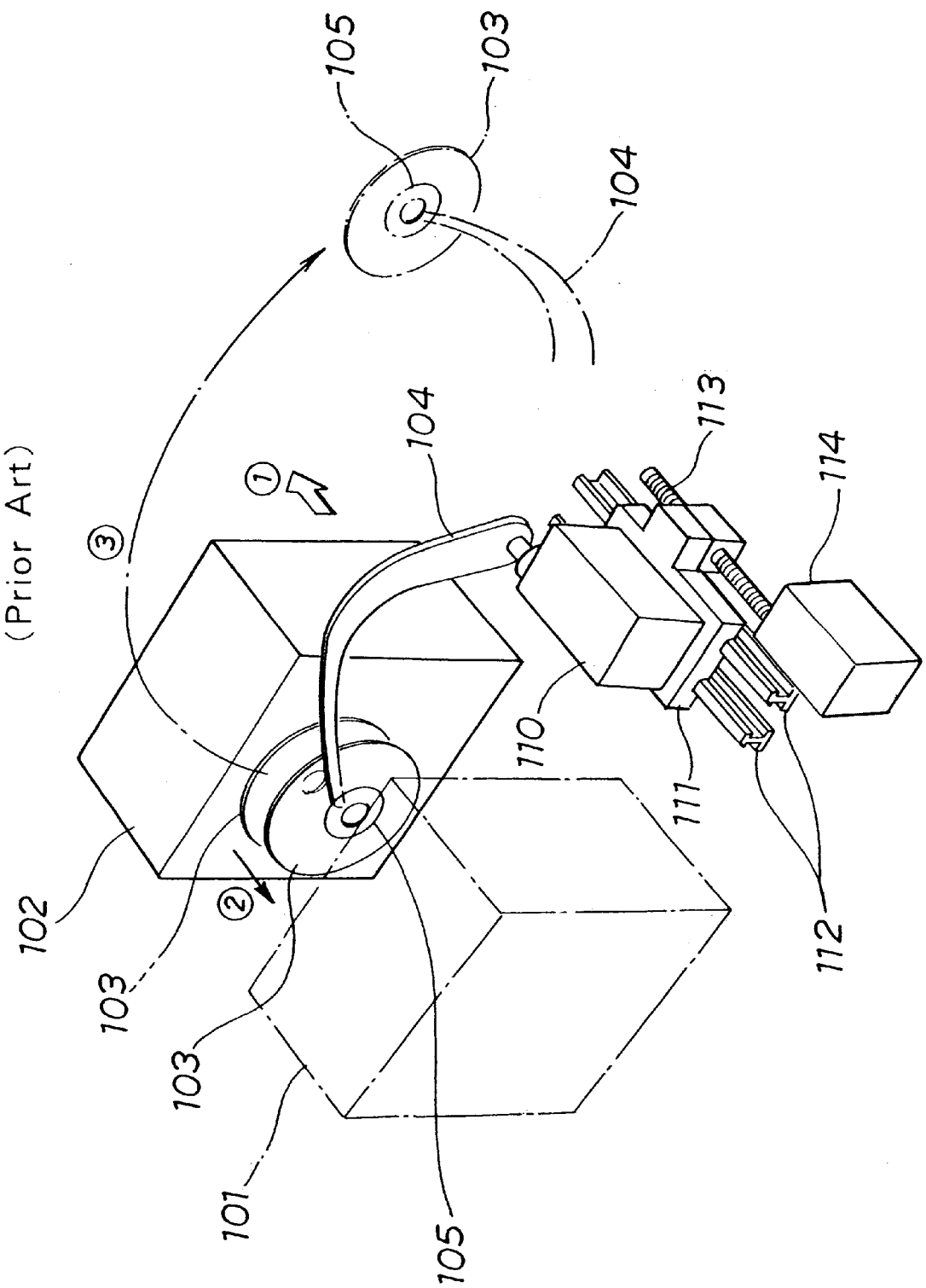
FIG. 5 is a schematic perspective view showing a typical example of a conventional disk removing device, which is particularly explanatory of basic operating principles of the device.

As may be apparent from a comparison to the conventional counterpart shown in FIG. 5, the inventive disk removing device 10 of FIG. 3 is constructed as the uniaxial drive device which has a significantly reduced size and thus can be installed snugly in a smaller space. As a result, the necessary installing space of the disk removing device 10 attached to the injection molding apparatus can be minimized, which can therefore make the injection molding apparatus more compact in size.

Figure 4:
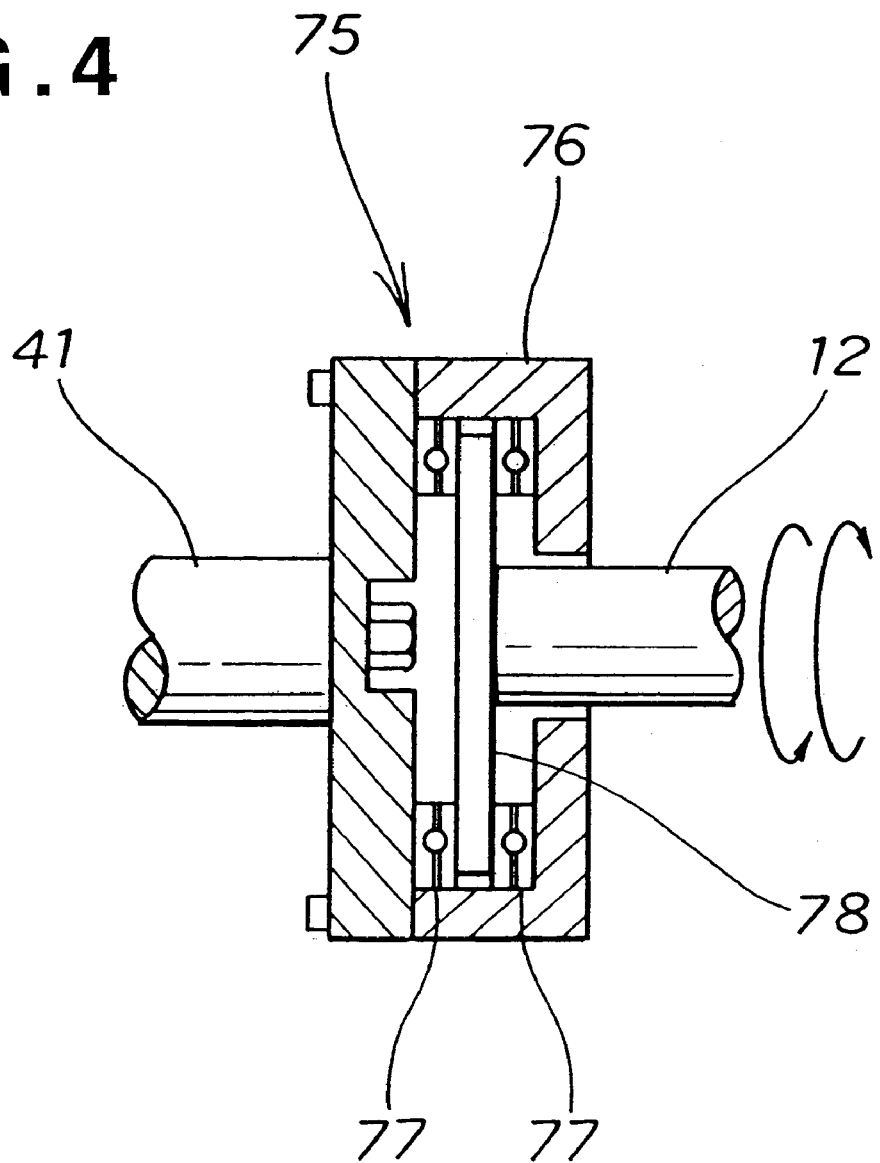
FIG. 4 is a sectional view showing a modified example of a shaft coupling shown in FIG. 2.

FIG. 4 is a sectional view showing a modified example of the shaft coupling 64 shown in FIG. 2. Depending on the type of the linear motor used, the linear shaft 41 may have to be inhibited from rotating due to certain structural reasons. Thus, the modified shaft coupling 75 is used in place of the shaft coupling 64. The modified shaft coupling 75 includes a disk-shaped member 78 rotatably mounted within a coupling case 76 via bearings 77. The disk-shaped member 78 is coupled to the end of the arm support shaft 12 remote from the disk pickup arm 11, and the coupling case 76 is fixed to one end of the linear shaft 41 so as to not permit rotation of the linear shaft 41. Alternatively, the coupling case 76 may be fixed to the end of the arm support shaft 12; this alternative too can attain a similar result.

Note that in the illustrated example of FIG. 2, the cylindrical casing 60 may be expanded in such a manner that the linear motor case 44 can be replaced by the expanded portion of the casing 60 and the rotary motor 20 and linear motor 40 and other elements associated with these motors 20 and 40 can be accommodated together in series within the single expanded cylindrical casing 60. Namely, in this case, the linear shaft 41 is omitted by constructing the arm support shaft 12 to extend deeper into the linear motor 40, the stator coil 21 is secured to the inner surface of the cylindrical casing 60 with the rotary motor case 22 omitted, and the core 43 is secured to the expanded portion of the casing 60.

However, if there is employed the arrangement that the rotary motor case 22 and linear motor 40 are incorporated together within or attached to the cylindrical casing 60 as in the case of FIG. 2, then the rotary motor 20 and linear motor 40 may be manufactured in separate places. In addition, the freedom or flexibility in combining the rotary motor 20 and linear motor 40 can be effectively enhanced; that is, different models of the rotary motor 20 and linear motor 40 can be combined variously.

What is claimed is:

1. A disk removing device for removing, from an injection mold unit, a disk molded by said injection mold unit, said disk removing device comprising:
- a disk pickup arm for grasping the disk at a tip end portion of said disk pickup arm;
- an arm support shaft having said disk pickup arm at a distal end portion thereof;
- a bearing member for supporting said arm support shaft for axial movement and rotation relative to said bearing member;
- a rotary motor for rotating said bearing member about an axis of said arm support shaft; and
- axial drive means for linearly moving said arm support shaft in an axial direction of said arm support shaft,
- wherein said arm support shaft is provided to extend through said rotary motor so as to operatively connect said rotary motor and said axial drive means in series with each other along the axial direction of said arm support shaft, and whereby said disk removing device operates as a uniaxial drive device.

2. A disk removing device as claimed in claim 1 wherein said axial drive means is a linear motor.

3. A disk removing device as claimed in claim 1 wherein said arm support shaft is rotated via a planetary-gear speed reduction mechanism.

4. A disk removing device as claimed in claim 1 wherein said arm support shaft is coupled to a linear shaft of said axial drive means via a shaft coupling.

5. A disk removing device as claimed in claim 4 wherein said shaft coupling has a non-rotatable coupling case, said arm support shaft is rotatably connected to said coupling case via bearings, and said linear shaft is connected directly to said coupling case.

* * * * *